United States Patent Office 3,793,393
Patented Feb. 19, 1974

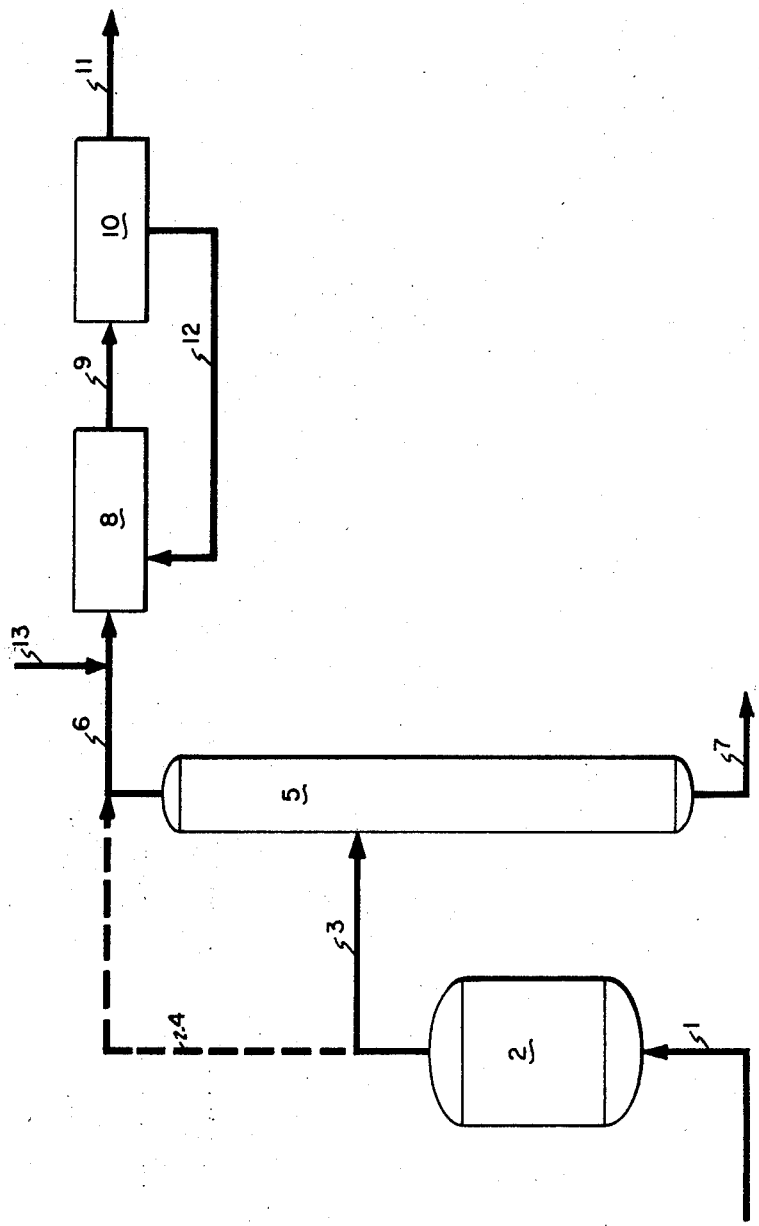

3,793,393
ISOMERIZATION PROCESS WITH SUPPORTED
NICKEL OXIDE CATALYST
Arthur H. Neal, 1673 Mohawk Lane,
Scotch Plains, N.J. 07076
Filed Feb. 2, 1972, Ser. No. 222,758
Int. Cl. C07c 5/24, 3/54
U.S. Cl. 260—683.47                    16 Claims

ABSTRACT OF THE DISCLOSURE

An olefin-containing stream comprising isomerizable olefins is contacted with a catalyst comprising nickel oxide, at isomerization conditions thereby forming a double bond isomer of the isomerizable olefins. At least a portion of the product from the isomerization step may then be contacted with a paraffin and an alkylation catalyst at conditions sufficient to form alkylate of high octane number.

BACKGROUND OF THE INVENTION

Field of the invention

The present invention concerns a hydrocarbon conversion process. More particularly, the invention relates to the isomerization of a double bond isomerizable olefin in the presence of an isomerization catalyst. Still more particularly, the invention relates to an integrated process in which at least a portion of the product from the isomerization is alkylated with a paraffin in the presence of an alkylation catalyst thereby forming alkylate of high octane number.

DESCRIPTION OF THE PRIOR ART

In the past, it has been found that alkylate products derived from internal olefins such as butene-2, are generally of higher octane quality than the corresponding alkylate product derived from terminal olefins such as butene-1. In an attempt to obtain large amounts of the more desirable internal olefins, attempts have been made in the past to develop isomerization processes whereby a terminal olefin is isomerized to an internal olefin. However, these isomerization processes have been plagued with many difficulties including the high cost of the isomerization catalyst, poor conversion efficiency and severe process conditions. Thus, for example, high temperatures had to be used in order to effectuate the desired isomerization.

Typical of prior art processes is the invention disclosed in U.S. Pat. 3,592,869 to Louis F. Heckelburg. The process comprises contacting an olefin feed, particularly butene-1, with a catalyst comprising ruthenium oxide in order to convert the butene-1 to butene-2. Although it is disclosed that conversion temperatures ranging from 200° to about 700° F. may be used, preferred temperatures range from 300°–600° F. The process suffers from several disadvantages particularly the high cost of the ruthenium oxide catalyst, the relatively high temperatures that must be employed and the low conversion of the terminal olefin to the internal olefin. The overall poor conversion efficiency of this process is probably related to the low isomerization activity of the catalyst employed.

Another typical isomerization process is disclosed in U.S. Pat. 3,215,751 to Bourne et al., wherein an elemental nickel catalyst supported on sepiolite is contacted with a terminal olefin to isomerize the same to an internal olefin. The process is run in the presence of 50 to 90 mole percent of hydrogen, and the disclosed feedstock contains at least 1 diene and 1 monoolefin. The difficulties with this process are that the nickel catalyst must first be reduced in a hydrogen atmosphere and subsequently treated with a sulfur compound before being used in the isomerization process. This is an expensive and time consuming pretreatment step. Additionally, care must be taken not to expose the reduced nickel catalyst to an oxygen-containing atmosphere, in order to avoid oxidation of the catalyst to nickel oxide.

U.S. Pat. 3,180,819 to Slaymaker et al. discloses an isomerization process whereby a feedstock comprising dienes and terminal monoolefins is contacted with a sulfide of at least one metal from Group VI and/or VIII of the Periodic Table to yield isoparaffinic products. The process is conducted in the presence of large amounts of hydrogen and is run at relatively severe temperature conditions, i.e., 400°–900° F. The use of high temperatures and the need for the presence of large amounts of hydrogen results in a highly expensive process.

SUMMARY OF THE INVENTION

In accordance with the present invention, the difficulties encountered in the prior art isomerization processes have been solved and high isomerization conversion efficiency at low reaction temperatures has been obtained when an olefin-containing stream comprising double bond isomerizable olefins is contacted with a catalyst comprising nickel oxide, at isomerization conditions, thereby forming double bond isomers of the isomerization olefins. The overall effect of the isomerization step is to shift the double bond in the olefin from one position to another. Preferably, the double bond in the reactant olefin will be located at a terminal position in the compound, and the net effect of the process will be to shift the double bond to an internal position. In one embodiment of the invention, at least a portion of the isomerized product from the isomerization step can be alkylated to yield alkylate product of high octane number.

The process feedstock can, in theory, comprise any double bond isomerizable olefin or mixtures thereof. Thus, the invention contemplates the use of olefinic feeds derived from various refinery cuts. In this regard, $C_2$, $C_3$, $C_4$ and $C_5$ olefin cuts from thermal and/or catalytic cracking units; spent gases; normally liquid products from sulfuric acid or phosphoric acid catalyzed polymerization and copolymerization processes; and products, normally liquid in character, from thermal and/or catalytic cracking units, are all excellent feedstocks for the subject isomerization process. The invention finds particular utility with respect to terminal olefins containing at least 4 carbon atoms per molecule and preferably from 4 to 10 carbon atoms per molecule, most preferably from 4 to 5 carbon atoms per molecule. Exemplary of such compounds are those characterized by the following empirical formula:

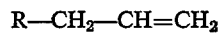

$$R-CH_2-CH=CH_2$$

wherein R can be an alkyl radical having 1 to 7 carbon atoms, or a phenyl, methylphenyl or cycloalkyl radical having 5 to 7 carbon atoms. Nonlimiting examples of the above olefins which can be used in the subject process include 1-butene, 1-pentene, 1-hexene, 1-decene, 5-methyl-1-hexene, 7-methyl-1-nonene, 3-cyclopentyl-1-propene and the like, or mixtures thereof.

One embodiment of the invention contemplates the substantial absence, i.e., less than about 5 wt. percent, based on the total feedstock to the isomerization process, of isobutylene in the isomerization feedstock. Although it has been found in the past that the presence of isobutylene in a $C_4$ olefin-containing stream may prove somewhat detrimental to product quality in an alkylation process, this complication is overcome in the instant invention by the substantial polymerization of the isobutylene in the isomerization step. As disclosed in U.S. 3,518,323 to Lloyd A. Pine et al., it has been determined that isobutylene is substantially polymerized under process conditions similar to those used in the instant invention. However, since residual amounts of unpolymerized isobutylene in the alkylation feed may cause undesired side reactions, it may be desirable, in one embodiment, to use isomerization feedstocks with substantially no isobutylene present therein.

The isomerization feedstock may also contain small amounts of diolefinic and acetylenic materials. In general, as much as 1,000 p.p.m. (ω) based on total feed can be tolerated in the isomerization feed without any detrimental effects. Should larger amounts of these materials be present, it is generally preferable to run the isomerization process in the presence of hydrogen in order to convert these materials to non-interfering compounds. To this end, in another embodiment of the invention, from about 1 to about 10 moles of hydrogen per mole of diolefin and acetylene may be used. Any excess hydrogen is removed from the isomerizate prior to introduction of same into the alkylation zone. In addition, it is desirable to operate with feedstocks containing less than about 100 p.p.m. (ω) sulfur based on total feedstock. However, larger amounts of sulfur can be tolerated without adverse effects on the isomerization process.

The catalyst used in the process of the present invention, as indicated previously, comprises nickel oxide. The nickel oxide can exist as nickel oxide, nickel dioxide, nickel sesquioxide, nickel peroxide, or mixtures of these and other oxides. However, in most instances, nickel oxide is predominant in such mixtures. Preferably, the nickel oxide is associated with a substrate of high porosity and surface area. Preferred supports include silica, silica-alumina, silica-magnesia, alumina, titania, magnesia, zirconia, and the like, or mixtures thereof. Preferred supports include silica and silica-alumina. In the latter instance any suitable catalyst grade of silica-alumina can be employed. The most preferred support comprises amorphous silica-alumina containing from about 5 to about 45 wt. percent alumina, based on total catalyst. Preferably, the amount of alumina present ranges from 10 to about 25 wt. percent.

The nickel oxide and support may be mixed in any conventional manner such as by impregnation, coprecipitation, and the like. Suitably, the carrier is impregnated with about 0.1 to about 35 wt. percent, preferably from about 15 to about 30 wt. percent, of the nickel oxide, or mixtures of nickel oxides, based on the total weight of the resultant catalyst. The catalyst may be used in the form of pellets, spheres, or other convenient forms. The materials used in forming the catalyst hereinabove defined, often contain small amounts of impurities including, for example, sodium in the order of about 0.2 wt. percent. Amounts of these materials which do not substantially prevent the desired isomerization reaction or unduly promote side reactions are tolerable in the catalyst.

The catalysts of the instant invention can be activated or regenerated by contact with air at elevated temperatures for a time sufficient to produce the desired activity. Activation temperatures in the range of about 800° to about 1200° F. are suitable. A more detailed description of the catalysts employed in the subject process is found in U.S. Pat. 3,518,323 to Lloyd A. Pine et al., the disclosures of said patent relating to the catalyst definition being incorporated herein by reference.

Isomerization temperatures will generally be below about 300° F. and preferably below about 200° F., at pressures sufficient to maintain the feedstock substantially in the liquid state. The preferred operational temperatures range from about 100° to 250° F. and most preferably, from 150° to 200° F. Pressures in the range of from about atmospheric to about 2,000 p.s.i.g. and preferably from about 400 to 600 p.s.i.g. can be used. The space velocity for continuous operations while depending on the temperature and the type of olefin used can range from about 3 to about 30 and preferably from about 5 to about 20 parts by weight of olefin feed per part by weight of catalyst per hour.

The isomerization reaction mixture can be separated by conventional techniques and unconverted materials recycled to the isomerization zone, if desired. Although it is preferred to run the reaction neat, i.e., in the absence of solvents, solvents or diluents may be employed, if desired. Specific non-limiting examples of such solvents include propane, butanes, hexanes, light naphthas, kerosenes and other saturated petroleum hydrocarbon fractions.

The process may be carried out by any suitable contacting technique, either as a batch or continuous type of operation. It is preferred, for economic reasons, to carry out the process continuously. It has been generally established that in isomerization processes, the more intimate the contact between feedstock and catalyst, the better the yield of isomerized product obtained. With this in mind, the present process, when operated as a batch operation, is characterized by the use of vigorous mechanical stirring or shaking of the reactants and catalysts. While fixed bed operations are preferred, moving bed configurations may be used, if desired.

In another embodiment of the isomerization process, if the feed contains easily polymerizable olefins such as isobutylene, more accurate control of the quality of the final product may be obtained if the reaction system is provided with recycle features, wherein the heavy polymeric product is separated by distillation from the reaction mixture, and the partially converted hydrocarbons are mixed with fresh feed and returned to the reactor. Alternatively, the recovered feed may be passed to a second reactor and further converted.

In general, reaction and/or recovery schemes and apparatus employed in conjunction with prior art catalyst systems similar in nature to that used in the instant process, can be used with the catalyst systems and conditions of the present invention.

As indicated supra, in another embodiment of the invention at least a portion of the product from the isomerization step can be used as an olefin stream for alkylation.

The catalyst compositions which can be employed in the alkylation step include the strong acids such as sulfuric acid, hydrogen fluoride, halosulfuric acid, such as fluorosulfuric acid, trihalomethanesulfonic acid, such as trifluoromethanesulfonic acid and the like. In addition, strong acids in combination with catalyst promoters may also be employed. Thus, for example, halosulfuric acids, trihalomethanesulfonic acids or mixtures thereof may be used in conjunction with varying quantities of water, aliphatic and cycloaliphatic alcohols, thiols, ethers and thioethers, aliphatic, cycloaliphatic or aromatic sulfonic and carboxylic acids and their derivatives or inorganic acids.

The alcohols and thiols preferably contain 1 to 10 carbon atoms and 1 to 10 hydroxyl or mercapto groups per molecule. The lower molecular weight saturated alcohols and thiols are most preferred and contain desirably 1 to 7 carbon atoms and 1 to 4 hydroxyl or mercapto groups per molecule. The ethers and thioethers are preferably saturated and contain 2 to 10, preferably 2 to 5 carbon atoms per molecule. In the latter instance while monoether and monothioether compounds are preferred promoters, compounds containing up to 3 or more alkoxy or thioalkoxy groups are also contemplated. The sulfonic and carboxylic acids preferably contain 1 to 10, most preferably 1 to 7 carbon atoms per molecule. In addition, the acids can be substituted with one or more carboxy or sulfo groups. The acid derivatives include the esters and anhydrides and preferably contain 2 to 20 carbon atoms, most preferably 2 to 10 carbon atoms per molecule.

The aliphatic, cycloaliphatic and aromatic portions of the aforementioned promoters can be optionally substituted with a variety of substituents such as halogen atoms, and such groups as hydroxy, mercapto, $C_1$–$C_5$ alkoxy, $C_1$–$C_5$ alkylthio, $C_1$–$C_5$ perhaloalkyl, $C_2$–$C_6$ carboalkoxy, carboxy, $C_1$–$C_{10}$ hydrocarbyl, preferably $C_1$–$C_5$ alkyl or $C_3$–$C_{10}$ cycloalkyl or combinations thereof.

The inorganic acids will in general be less acidic than the strong acid components of the catalyst system and desirably will have $H_0$ values, i.e. $-\log h_0$ (Hammett acidity function) greater than about $-11$ (see Gould E., "Mechanism and Structure In Organic Chemistry," New York, Holt, Rinehardt & Winston, Inc., 1959, 106). Preferred inorganic acids contain 1 to 4 hydroxyl groups per molecule.

Preferred catalyst promoters contain either a hydroxy group, such as alcohols or a hydroxy group precursor, such as ethers which cleave to form alcohols under acidic conditions. Of these, the most preferred compounds are the lower molecular weight alcohols such as ethyl alcohol, the lower molecular weight ethers such as diethyl ether and water. It is noted that while the catalyst promoter and strong acid are desirably premixed prior to introduction into the alkylation zone, the process also contemplates the in situ formation of the catalyst system. Thus, for example, $HSO_3F$, $SO_3$, $HF$ and a promoter can be fed to the alkylation zone in the case of the $HSO_3F$/promoter catalyst system. It has been found that the concentration of the promoter in the catalyst system is important to the production of high-quality alkylate. The promoter is admixed with the strong acid catalyst component in amounts ranging from about 5 to about 45 mole percent based on total acid in the catalyst, preferably about 10 to about 30 mole percent, and still more preferably about 15 to about 25 mole percent, e.g. 20 mole percent. In some instances, however, it may be desirable to use somewhat lower or higher amounts of promoter where, for example, increased catalyst activity or selectivity is desired.

In the case of hydroxyl-containing promoters or promoters containing hydroxyl group precursors, i.e. latent hydroxyl groups, the concentration of the promoter in the total catalyst may fall below the above-specified concentration range, i.e., about 5 to about 45 mole percent based on acid. It appears that the promoting efficiency of hydroxy compounds is directly related to the overall number of hydroxyl groups or latent hydroxyl groups present per molecule. Thus, ethanol with one hydroxyl group should have promoter activities similar to 0.5 mole of ethylene glycol with two hydroxyl groups. Hence, as the number of hydroxyl groups or latent hydroxyl groups per molecule of promoter increases, the required concentration of total compound in the catalyst will decrease. It is speculated that the same relationship also holds for thiol and thioether compounds. Although the broad concentration ranges are generally independent of the type of promoter used, the preferred or optimal range will vary depending on the structure of the promoter, the reactor temperature, the concentration of olefin in the feed, the olefin space velocity, and the isoparaffin concentration in the reactor hydrocarbon.

The process of the invention also contemplates the use of strong Bronsted acids in conjunction with one or more Lewis acids of the Formula $MX_n$ where M is selected from the Group IV–B, V or VI–B elements of the Periodic Table, X is a halogen atom, preferably fluorine, and $n$ varies from 3 to 6. The Periodic Table referred to is that described in "Encyclopedia of Chemistry," Reinhold Publishing Corporation, 2nd ed., 1966, 790. Suitable IV–B, V or VI–B elements include titanium, vanadium, zirconium, niobium, phosphorus, tantalum, molybdenum, chromium, tungsten, arsenic, antimony, bismuth and the like. The term "elements" as used herein refers to the metals and metalloids of the aforementioned Groups of the Periodic Table. Particularly preferred metal halides are the metal fluorides that include antimony pentafluoride, tantalum pentafluoride, niobium pentafluoride, titanium tetrafluoride, vanadium pentafluoride and the like.

Particularly preferred catalyst combinations include antimony pentafluoride-fluorosulfuric acid, tantalum pentafluoride-fluorosulfuric acid, niobium pentafluoride-fluorosulfuric acid, titanium tetrafluoride-fluorosulfuric acid, antimony pentafluoride-trifluoromethanesulfonic acid, tantalum pentafluoride-trifluoromethanesulfonic acid, niobium pentafluoride-trifluoromethanesulfonic acid, titanium tetrafluoride-trifluoromethane sulfonic acid and the like. Generally the catalyst comprises about 1 to 20 moles of the Bronsted acid to 1 mole of the Lewis acid. Preferably, the molar ratio of Bronsted to Lewis acid ranges from about 5:1 to 1:1. In addition to the above-mentioned catalysts, crystalline aluminosilicate zeolites may also be used as process catalysts.

The amount of total olefin contacted with catalyst can range from about 0.05 to 1000 volumes of olefins per hour per volume of catalyst inventory in the reactor (v./v./hr.), i.e. olefin space velocity. Preferably, the olefin space velocity can range from about 0.05 to 10 v./v./hrs. and still more preferably, from about 0.05 to 1 v./v./hr., e.g. 0.1 v./v./hr. The volume percent of total catalyst in the reaction mixture or emulsion in the reactor (when liquid phase operations are used), which mixture or emulsion comprises a hydrocarbon phase and a catalyst phase, is maintained at high levels, i.e. from about 40 to 90 volume percent based on total reaction mixture and preferably from about 50 to 80 volume percent. The isoparaffin concentration, including alkylate, in the hydrocarbon phase (in a liquid phase process) of the reaction mixture can range from about 45 to 95 volume percent based on the total volume of the hydrocarbon phase and preferably from about 50 to 90 volume percent. Such isoparaffin concentrations can be maintained by recycling unreacted isoparaffin to the reactor.

The catalysts may be used undiluted or, alternatively, diluted in solvents inert under the reaction conditions or incorporated with a suitable solid carrier or support. Typical diluents include sulfuryl chloride fluoride, sulfuryl chloride, fluorinated hydrocarbons, mixtures thereof and the like. The diluent catalyst volume ratio can range from about 20:1 to 1:1. Higher dilutions may be desirable, for instance, in those reactions that proceed with high exothermicity. Suitable solid carriers that can be used should be substantially inert to the catalyst under the reaction conditions. Therefore, active supports may be rendered inert by coating them with an inert material such as antimony trifluoride or aluminum trifluoride. Examples of such carriers include silica gel, anhydrous $AlF_3$, aluminum phosphate, carbon, coke, firebrick, and the like.

The hydrocarbon feedstocks that are reacted with the olefins desirably comprise straight and/or branched chain $C_2$–$C_{10}$ paraffins such as hexane, butane and the like and preferably $C_4$–$C_6$ isoparaffins such as isobutane, isopentane, isohexane and the like. While open chain hydrocarbons are preferred, cycloparaffins may also be used.

Preferably, the olefin stream is first diluted with paraffin before being introduced into the reactor. The olefin concentration in the paraffin feed ranges from about 0.5 to 25 volume percent based on total feed, and preferably below about 10 volume percent. Translated into volume ratios, high volume ratios of paraffin to olefin ranging from about 10:1 to about 200:1 or higher are preferred although somewhat lower ratios may be used, e.g. 3:1. Correspondingly high volume ratios of paraffin to olefin are also desired within the reaction zone. Preferably, the paraffin/olefin volume ratio therein ranges from about 20:1 to 2000:1 or higher.

The process may be carried out either as a batch or continuous type operation although it is preferred for economic reasons to carry out the process continuously. It has been generally established that in alkylation processes, the more intimate the contact between feedstock and catalysts the better the yield of saturated product obtained. With this in mind, the present process, when operated as a batch operation, is characterized by the use of high levels of agitation, i.e. vigorous mechanical stirring or shaking of the reactants and catalyst.

In continuous operation, in one embodiment, reactants may be maintained at sufficient pressures and temperatures to keep them substantially in the liquid phase and then continuously forced through dispersion devices into the reaction zone. The dispersion devices may be jets, porous thimbles and the like. The reactants are subsequently mixed with the catalyst by conventional mixing means such as mechanical agitators and the like. After a sufficient time the product can then be continuously separated from the catalyst and withdrawn from the reaction system while the partially spent catalyst is recycled to the reactor. If desired, a portion of the catalyst can be regenerated or reactivated by any suitable treatment and returned to the alkylation reactor.

As in other alkylation processes, more accurate control of the quality of the final product may be obtained if the reaction system is provided with a recycling feature wherein the partially consumed isoparaffins are recovered, recycled and mixed with a fresh feed and returned to the feed dispersion device in the reactor. In general, reaction and/or recovery schemes and apparatus employed in conjunction with prior art liquid acid catalyst systems can be used with the catalyst systems of the present invention.

In carrying out alkylations using the catalyst systems of this invention, a wide temperature range may be utilized, e.g. about −80 to 150° F.; however, fairly low reaction temperatures are preferred. Therefore, temperatures ranging from about −80 to 100° F., preferably from about −60 to 100° F., most preferably from about −20 to +40° F., are usually employed. Where the reaction is carried out at temperatures above about 10° F. it is necessary that the reaction be conducted under superatmospheric pressure, if both the reactants and catalysts are to be maintained substantially in the liquid phase (this applies only to the lower molecular weight low boiling reactants). Typically, the alkylation reaction is conducted at pressures ranging from about 1 to 20 atmospheres.

In general, it is preferable to use pressures sufficient to maintain the reactants in the liquid phase although a vapor phase operation is also contemplated. Autorefrigerative reactors and the like may be employed to maintain liquid phase operation.

The aforedescribed olefins and saturated hydrocarbons are contacted with the catalyst for a time sufficient to effect the degree of alkylation desired. In general the time of contact is subject to wide variation, the length of residence time being dependent in part upon the reaction temperature, the olefin used and the catalyst concentration employed. By way of illustration, typical contact times can range from about 5 minutes to one hour or more; however, much shorter contact times, i.e. as low as 0.1 second, can also be used as indicated supra, if desired.

BRIEF DESCRIPTION OF THE DRAWING

The figure refers to a combined isomerization-alkylation process of an olefin-containing stream.

Referring to the figure in detail, a $C_2$–$C_5$ olefin-containing stream comprising double-bond isomerizable olefins, is introduced via line 1 into isomerization reaction zone 2. The olefin mixture is contacted therein with a catalyst comprising nickel oxide on a silica-alumina support at temperatures ranging between 100° F. and 300° F. for a time sufficient to isomerize the double bond of the said isomerizable olefins.

In one embodiment, where isobutylene is present in the feed in a substantial amount, i.e. greater than about 5 wt. percent based on total feed, the isobutylene will polymerize thereby forming an isobutylene polymer. The total reaction mixture is removed via line 3 and conducted to distillation zone 5 wherein the isobutylene polymer is removed via line 7, and used directly for blending into gasoline. Double-bond isomerized material is removed from distillation zone 5 via line 6. In a second embodiment of the invention where isobutylene is not present in the feed to isomerization zone 2, the isomerized product is removed from zone 2 via line 4, bypassing distillation zone 5 and introduced directly into alkylation zone 8.

In the first embodiment as hereinabove described, the distillate from zone 5 (removed via line 6) is introduced into alkylation zone 8. Isoparaffin is preferably mixed with the olefin stream via line 13 prior to its introduction into the alkylation zone. However, it is noted that, alternatively, the isoparaffin can be admitted directly to the alkylation zone without predilution.

In general, the isoparaffin/olefin volume ratio in the feed will range between 10:1 to 200:1 or higher (in the feed line), while in the reaction zone, i.e. zone 8, the volume ratio will range preferably between about 20:1 to 2000:1 or higher. The reactants are agitated in the presence of an alkylation catalyst as defined in more detail hereinabove, for a time sufficient to form the desired alkylate product which is removed via line 9 and introduced into settler 10.

Recovered alkylation catalyst may be recycled from settler 10 via line 12 to alkylation zone 8. Although not shown, the alkylation catalyst may be reactivated or regenerated if necessary prior to recycling to alkylation zone 8. Product from settler 10 is removed via line 11. Although not shown, unreacted components may be separated from the product in line 11 and recycled to alkylation zone 8 for further reaction. The alkylate product recovered from line 11 is preferably treated with base to neutralize any residual acid remaining in the product, and is thereafter used directly, as for example, in the blending of gasoline.

DESCRIPTION OF THE PREFERRED EMBODIMENTS

The invention will be further understood by reference to the following examples:

Example 1

This example illustrates the preparation of a typical nickel oxide catalyst used in the subject isomerization process. A supported nickel oxide catalyst was prepared by mixing a slurry of 80 grams of powdered, precalcined silica-alumina cracking catalyst, containing 25 wt. percent alumina with a solution of 100 grams $Ni(NO_3)_2 \cdot 6H_2O$ in 100 cc. of water. After one-half hour of stirring, 52.4 grams of $(NH_4)_2CO_3$ in 300 cc. of water was added slowly and stirred for an additional hour. The resulting mixture was filtered, the product washed with water, dried at 300° F. and finally calcined for 6 hours in air at 1100° F. The catalyst was then pilled, crushed and screened to obtain the 14–35 mesh fraction. The finished catalyst contained 17.9 wt. percent nickel based on total catalyst.

Example 2

The above catalyst (3.5 g.) was charged to a ½″ diameter tubular reactor equipped for continuous flow-through operation at constant pressure and temperature. After bringing the reactor to temperature, a butene fraction derived from a fluid catalytic cracking process was introduced at a rate of 144 grams/hr., equivalent to 19 weights of olefin/hr./weight of catalyst. The temperature was maintained at 150° F., and pressure at 400 p.s.i.g. The total product was collected in a glycol-refrigerated accumulator. After two hours of equilibrated operation, the collected product was allowed to stabilize to room temperature. The volume of vaporized product was measured by a wet-test meter, and its composition determined on a composite sample by conventional gas chromatographic techniques using a 30-foot column of 2,5-hexanedione on Chromosorb P operated at 0° C. The stabilized liquid product was weighed and also analyzed by gas chromatograph, using a 10-foot column of SE 30 on Chromosorb W programmed from 400 to 275° C. In both cases the peak areas were corrected for thermal response and the resulting values expressed as weight percent. The two analyses were then compiled to give an analysis of the total product as shown below:

TABLE I

| | Composition, wt. percent | |
|---|---|---|
| | Feed | Product |
| $C_2$-$C_3$ | 0.9 | 0.3 |
| Butanes | 52.4 | 52.6 |
| Butene-1 | 9.8 | 8.2 |
| Isobutylene | 11.2 | 1.0 |
| Cis and Trans butene-2 | 24.9 | 22.8 |
| $C_5$ and heavier | 0.8 | 15.0 |

Under these very mild conditions, the isobutylene was selectively converted (91 wt. percent) to polymer, with moderate isomerization of the normal butenes. The concentration of the desired cis and trans butene-2 in the recovered butenes was increased thereby from 54 wt. percent of the total butenes to 71 wt. percent. This leads to much more efficient utilization in alkylation or other processing and in the case of alkylation leads to higher octane product.

Example 3

The catalyst was prepared as described in Example 1 except that the solution of nickel nitrate in the slurry of powdered silica- alumina was adjusted to give slightly acidic conditions during the addition of the $(NH_4)_2CO_3$. The finished catalyst contained about 16.5 wt. percent nickel based on total catalyst.

Two hundred cc. of the 14–35 mesh fraction of the catalyst was mixed with 800 cc. of mullite and the mixture charged to a 1000 cc. reactor equipped for continuous feed of liquid hydrocarbons and continuous collection of the reactor effluent. A mixed butene feed obtained from a fluid catalytic cracking process was added continuously at 18 wts. of olefin/hr./wt. of catalyst, while the reaction pressure was maintained at 500 p.s.i.g., and the temperature at 193° F. The products were collected and analyzed as hereinabove described in Example 2 with the results shown below in Table II:

TABLE II

| | Composition, wt. percent | |
|---|---|---|
| | Feed | Product |
| $C_3$ | 0.9 | 0.3 |
| Butanes | 50.5 | 50.6 |
| Butene-1 | 10.4 | 5.6 |
| Isobutylene | 11.3 | 1.1 |
| Cis and trans butene-2 | 23.1 | 26.6 |
| $C_5$ | 3.9 | 3.1 |
| $C_{6+}$[1] | 0 | 12.6 |
| Percent isobutylene conversion | | 90 |
| Percent butene-1 conversion | | 46 |
| Percent and trans-butene-2 in total butenes | 52 | 80 |

[1] The $C_{6+}$ fraction was largely $C_8$ and $C_{12}$ olefins. It was estimated from gas chromatographic retention times that over 80% of the $C_{6+}$ compounds were isobutylene dimers and trimers.

Thus, the higher temperatures and lower feed rate vis-a-vis Example 2 resulted in higher conversions of isobutylene to polymer and more importantly greater isomerization of the butene-1 to the desired cis and trans butene-2.

The octane quality of the $C_{6+}$ material formed in this experiment was determined by distilling the product to obtain a $C_8$ cut and a bottoms cut (mostly $C_{12}$). The data is given below in Table III:

TABLE III

| | $C_8$ cut 175–275° F. | $C_{12}$ cut bottoms |
|---|---|---|
| Yield on $C_{6+}$ (percent) | 63 | 37 |
| RON + 1 cc | 101.9 | 101.1 |
| RON + 3 cc | 102.7 | 102.0 |
| MON + 1 cc | 88.0 | 89.8 |
| MON + 3 cc | 88.3 | 91.2 |
| Reid V.P | 2.50 | 0.50 |
| Distillation, ASTM, ° F.: | | |
| Initial | 182 | 318 |
| 10 percent | 215 | 342 |
| 50 percent | 220 | 358 |
| 90 percent | 126 | 380 |
| Final | 260 | 478 |

The data indicate the high octane quality of the polymerization product.

Example 4

To demonstrate that there was no appreciable loss of normal butenes by polymer formation under the conditions of the previous examples, the following laboratory experiments were carried out. In a 300 cc. stirred autoclave were charged 2 g. of the nickel oxide catalyst from Example 3 and 150 g. of liquid butenes containing 75 wt. percent butene-1 and 25 wt. percent isobutylene. The reaction proceeded at constant temperature and samples were withdrawn and analyzed at intervals until complete polymerization of the isobutylene had occurred. The test was repeated at various temperatures. The conversion of butene-1 at 100% conversion of the isobutylene was less than 5 wt. percent in each case.

TABLE IV

| Reaction temperature, ° F. | Percent butene-1 polymerization at 100% isobutylene conversion |
|---|---|
| 105 | 3.0 |
| 135 | 4.0 |
| 175 | 4.5 |

In view of the above data it is clear that the instant process affords high quality isomerizate under relatively mild conditions and thereby affords high quality feedstocks for subsequent alkylation reactions.

EXAMPLE V

The following is a speculative example using an isobutylene-free olefin stream in the isomerization process followed by alkylation of the isomerizate:

A $C_4$ hydrocarbon fraction which has been previously processed to extract isobutylene and butadiene has the following composition:

TABLE V

| | Wt. percent |
|---|---|
| $C_3$ and lighter | 2.20 |
| Butanes | 5.40 |
| Butene-1 | 64.38 |
| Cis and trans butene-2 | 24.79 |
| $C_5$ and heavier | 3.23 |

This fraction is fed at 170° F. and 500 p.s.i.g. over a fixed bed of nickel oxide catalyst pellets (18% Ni) supported on silica-alumina. The feed rate is maintained at 10 volumes of total feed/hr./volume of catalyst. The total collected product is analyzed by gas chromatography and is found to contain 17.44% butene-1 and 69.33% cis and trans butene-2. The recovered product without further treatment is used directly for isobutane alkylation.

What is claimed is:

1. A double bond isomerization process comprising contacting an olefin-containing stream comprising a double bond isomerizable olefin with a catalyst consisting essentially of between about 15 and 30 wt. percent, based on total catalyst of one or more oxides of nickel, supported on a substrate of high porosity and surface area and selected from the group consisting of silica, alumina, silica-alumina, silica-magnesia, titania, magnesia, zirconia, and mixtures thereof, at an isomerization temperature ranging between about 100 and 250° F., said olefin-containing stream being substantially free of isobutylene, thereby forming a double bond-isomer of said isomerizable olefin.

2. The process of claim 1 wherein the temperature ranges between 150° and 200° F.

3. The process of claim 1, wherein the olefin-containing stream contains less than about 5 wt. percent isobutylene based on total feed.

4. The process of claim 1, wherein said olefin-containing stream comprises more than about 1,000 p.p.m.

(wt.) of diolefinic and acetylenic materials and wherein the isomerization is conducted in the presence of from about 1 to about 10 moles of hydrogen per mole of said diolefinic and acetylenic materials.

5. The process of claim 1, wherein the olefin-containing stream comprises olefins containing four carbon atoms per molecule and wherein said nickel oxide is supported on a silica-alumina substrate.

6. The process of claim 1, wherein said isomerization is conducted in the substantial absence of hydrogen.

7. An integrated process comprising (a) contacting an olefin-containing stream containing a double bond isomerizable olefin with a catalyst comprising between about 15 and 30 wt. percent nickel oxide, based on total catalyst, and a substrate of high porosity and surface area associated with said nickel oxide, said substrate selected from the group consisting of silica, alumina, silica-alumina, silica-magnesia, titania, magnesia, zirconia and mixtures thereof, at an isomerization temperature ranging between about 100° and 250° F., thereby forming isomerized product comprising a double bond isomer of said isomerizable olefin, (b) contacting at least a portion of the isomerized product from step (a) with an isoparaffin, at alkylation conditions, in the presence of an alkylation catalyst, thereby forming alkylate of high octane number.

8. The process of claim 7, wherein the isomerization is conducted in the presence of a catalyst comprising about 15 to 30 wt. percent nickel oxide, based on total catalyst, supported on a silica-aluminia substrate.

9. The process of claim 7, wherein the olefin-containing stream to the isomerization contains less than about 5 wt. percent isobutylene based on total feedstock.

10. The process of claim 7, wherein the alkylation catalyst is formed by admixing fluorosulfuric acid, trifluoromethane sulfonic acid or mixtures thereof with between about 5 and 45 mole percent, based on acid, of water, a monohydroxy alcohol containing 1 to 7 carbon atoms per molecule, a monoether containing 2 to 5 carbon atoms per molecule or mixtures thereof.

11. The process of claim 7, wherein the alkylation catalyst comprises hydrofluoric acid or sulfuric acid.

12. The process of claim 7, wherein said olefin-containing stream comprises more than about 1,000 p.p.m. (wt.) of diolefinic and acetylenic materials and wherein the isomerization is conducted in the presence of from about 1 to about 10 moles of hydrogen per mole of said diolefinic and acetylenic materials.

13. The process of claim 7, wherein said isomerization is conducted in the substantial absence of hydrogen.

14. A double bond isomerization process comprising contacting an olefin-containing stream containing a double bond isomerizable olefin with a catalyst consisting essentially of between about 15 and 30 wt. percent, based on total catalyst, of one or more oxides of nickel and a substrate of high porosity and surface area associated with said oxides of nickel, said substrate selected from the group consisting of silica, alumina, silica-alumina, silica-magnesia, titania, magnesia, zirconia and mixtures thereof, said isomerization conducted at a temperature ranging between about 100° and 250° F., said olefin-containing stream being substantially free of isobutylene, thereby forming a double bond isomer of said isomerizable olefin.

15. The process of claim 14, wherein said olefin-containing stream comprises more than about 1,000 p.p.m. (wt.) of diolefinic and acetylenic materials and wherein the isomerization is conducted in the presence of from about 1 to about 10 moles of hydrogen per mole of said diolefinic and acetylenic materials.

16. The process of claim 14, wherein said isomerization is conducted in the substantial absence of hydrogen.

References Cited

UNITED STATES PATENTS

| | | | |
|---|---|---|---|
| 2,653,981 | 9/1953 | Hogan | 260—683.2 |
| 3,313,858 | 4/1967 | Clark et al. | 260—683.2 |
| 2,591,367 | 1/1952 | McAllister | 260—683.47 |
| 3,678,120 | 7/1972 | Bloch | 260—683.47 |
| 3,663,646 | 5/1972 | Chapman | 260—683.2 |

DELBERT E. GANTZ, Primary Examiner

G. J. CRASANAKIS, Assistant Examiner

U.S. Cl. X.R.

260—683.2, 683.48, 683.59